US006974249B1

(12) United States Patent
Fair et al.

(10) Patent No.: US 6,974,249 B1
(45) Date of Patent: Dec. 13, 2005

(54) THERMAL HISTORY SENSOR

(75) Inventors: Geoff E. Fair, Centerville, OH (US); Triplicane A. Parthasarathy, Beavercreek, OH (US); Ronald J. Kerans, Yellow Springs, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/801,294

(22) Filed: Mar. 17, 2004

(51) Int. Cl.$^7$ .......................... G01K 3/00; G01K 11/12; B32B 9/04; G01N 21/71
(52) U.S. Cl. ...................... 374/102; 374/162; 374/101; 374/161; 116/206; 428/701; 422/82.05; 422/82.12
(58) Field of Search .............................. 374/101, 102, 374/103, 104, 106, 110, 112, 161, 162, 159, 374/208; 116/200, 206; 428/701; 422/55, 422/57, 58, 61, 82.05, 82.09, 82.12, 83

(56) References Cited

U.S. PATENT DOCUMENTS

| | | | |
|---|---|---|---|
| 2,308,087 A * | 1/1943 | Lappala ..................... | 116/216 |
| 3,237,448 A | 3/1966 | Howell et al. | |
| 3,950,985 A | 4/1976 | Buchwald et al. | |
| 4,057,434 A * | 11/1977 | Rittler .......................... | 501/7 |
| 4,070,912 A * | 1/1978 | McNaughtan et al. ...... | 374/162 |
| 5,041,809 A * | 8/1991 | Payne et al. .................. | 338/25 |
| 5,975,758 A | 11/1999 | Yokota et al. | |
| 6,275,051 B1 * | 8/2001 | Bachelder et al. .......... | 324/754 |
| 6,318,760 B1 * | 11/2001 | Shadle et al. ................. | 283/95 |
| 6,616,332 B1 * | 9/2003 | Renken et al. .............. | 374/162 |
| 6,741,523 B1 * | 5/2004 | Bommarito et al. ........ | 368/327 |
| 6,787,108 B2 * | 9/2004 | Ribi .............................. | 422/58 |
| 2001/0050567 A1 * | 12/2001 | Bachelder et al. .......... | 324/754 |

FOREIGN PATENT DOCUMENTS

EP  141580 A1 *  5/1985  ........... C03C 10/00

OTHER PUBLICATIONS

Albert et al., "Cross-Reactive Chemical Sensor Arrays," Chemical Reviews (2000), American Chemical Society, vol. 100, No. 7, pp. 2595-2626.
Onorato et al., "A Kinetic Treatment of Glass Formation: IV Crystallization on Reheating a Glass," Journal of Non-Crystalline Solids, North-Holland Publishing Company, 41 (1980), pp. 189-200.
Briglin et al., "Vapor Detection, Classification, and Quantification Performance Using Arrays of Conducting Polymer Composite Chemically Sensitive Resistors," IEEE (2002), pp. 727-731.
Briglin et al., "Exploitation of Spatiotemporal Information and Geometric Optimization of Signal/Noise Performance Using Arrays of Carbon Black-Polymer Composite Vapor Detectors," Sensors and Actuators B, 82 (2002), pp. 54-74.
Gardner et al., "A Brief History of Electronic Noses," Sensors and Actuators B, 18-19 (1994), pp. 211-220.
Hopper et al., "Crystallization Statistics, Thermal History and Glass Formation," Journal of Non-Crystalline Solids, North-Holland Publishing Company, 15 (1974), pp. 45-62.

* cited by examiner

Primary Examiner—Gail Verbitsky
(74) Attorney, Agent, or Firm—ARMCLO/JAZ; Steve Sayeedi

(57) ABSTRACT

An improved thermal history sensor having multiple glass ceramic substrates with unique compositions is disclosed. By positioning the sensor adjacent to a component subject to thermal stressors, each of the glass ceramic substrates react with a different rate of nucleation and crystal growth and thus yield a specific measure of opacity. By comparing these values representing the opacity for each glass ceramic substrate, or thermal history fingerprint, to baseline data, information about the expected remaining useful lifetime of the component may be obtained.

19 Claims, 3 Drawing Sheets

THERMAL HISTORY SENSOR

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to the field of thermal effects on materials, and in particular, the analysis of the thermal history of a material for monitoring the structural integrity of material components exposed to temperature stressors.

2. Description of the Related Art

Material components exposed to high temperatures (above 400 kelvin) for various periods of time suffer degradation in their mechanical properties. Such degradation may ultimately lead to failure of the component, especially where such materials are exposed to repeated temperature cycles, extreme temperatures, rapid heating and cooling, or accompanied by other stressors, such as pressure and oxidation. Material components, such as those on a jet aircraft, for example, are routinely exposed to a combination of these stressors. Many such components are primarily affected by thermal stressors, which contribute to microstructural changes, creep, thermal stresses, thermal fatigue, and thermal shock, as well as oxidation-induced degradation of the material. Such components need to be replaced after, or preferably before, significant degradation occurs. Failure of components on aircraft, as a result of thermally induced degradation, can cause catastrophic damage in both economic and human terms.

In the case of jet aircraft, regular maintenance and replacement of critical components is therefore essential to prevent catastrophic damage. Aircraft components particularly subject to thermal stressors are typically replaced after a predetermined number of flight hours or after fractures or other defects are detected. These solutions, while generally effective, may result in either the premature replacement of a costly component or the failure to replace the component when necessary, resulting in a catastrophic failure.

If it were possible to accurately determine the remaining useful lifetime of an aircraft component, a mechanic or technician could replace the component before catastrophic failure and without prematurely replacing a component having a significant useful lifetime remaining. This would further reduce operating costs by facilitating the smooth operation of aircraft, as the aircraft components can be ordered as needed, thereby avoiding downtime and production or delivery delays while waiting for critical components. This would also reduce the cost of storing components that may not be needed for significant periods of time.

In an effort to reduce these costs, many attempts have been made to determine, with increasing accuracy, the useful lifetimes of aircraft components. These attempts generally involve an effort to determine the temperature that such components have been exposed to. Temperature indicating paints, for example, have been used to determine whether a threshold temperature has been reached. These paints, which are applied to a component, change color or burn away after being exposed to a specific temperature. While such techniques are useful for indicating that a component was exposed to a specific temperature, they do not reveal by how much the specific temperature was exceeded or for how long the component was exposed to any given temperature—both of which are important factors in determining the expected remaining useful lifetime of a component. Indeed, in some cases, the time of exposure at a specific temperature can be as important or an even more important factor in determining the useful lifetime of a component as the specific temperature of exposure itself.

Others have attempted to obtain more information about the time of exposure at a given temperature. For example, U.S. Pat. No. 5,975,758 issued Nov. 2, 1999 to Yokota et al., provides a sensor having electrodes for measuring the change in resistance of a material. This technique is intended to provide information about the time of exposure at a given temperature. Such procedures, however, cannot distinguish between different stressors having vastly different effects on the useful lifetime of components. In other words, the same change in resistance may be caused by either the brief exposure at a specific temperature or a longer exposure at a different temperature, though the useful lifetime typically depends on which specific stressor occurred. In addition, the change in resistance is rapid above a threshold temperature for a given material, thereby yielding less useful information about the most important temperature stressors. The device also utilizes lead wires, which limit the maximum temperature of exposure. Moreover, the device fails to distinguish the sequence of stressors—which can significantly impact the useful lifetime of a component. Finally, for those materials specifically designed to operate at high temperatures, significant degradation of components may occur at intermediate temperatures, such as during cool-down. These devices provide little, if any, such information about intermediate temperature exposure once the component has been exposed to higher operating temperatures.

Though a means to continuously or periodically monitor the temperature of a component, using a thermocouple, for example, would provide more valuable information, such methods may not be feasible at very high temperatures. In addition, such methods require a great deal of memory for storing a large amount of data, particularly where multiple sensors are desired, and may not be practical or possible on certain surfaces given, for example, the physical requirements for storing the data—which can themselves degrade under high operating temperatures.

Accordingly, there is a need for an improved method and sensor for accurately obtaining the thermal history, in both normal and extreme operating environments, of a variety of components simultaneously, and without generating an excessive amount of data. In particular, there is a need for determining how long and at what temperatures a material has been exposed to, and in some cases, for determining the order such temperature stressors have been applied.

SUMMARY OF THE INVENTION

An object of the invention is to provide an improved method and sensor for determining the thermal history of a component.

Another object of the invention is to provide a relatively inexpensive sensor that can be positioned adjacent to a component in order to obtain information about the thermal history of the component.

Another object of the invention is to provide a convenient means for reading a thermal history sensor and comparing it to baseline data to obtain accurate information about the thermal history of a component and its expected remaining useful lifetime.

To meet these and other objects, the present invention relates to a sensor for determining the thermal history of a component (such as a jet engine nozzle flap or turbine blade, for example) subject to thermal stressors.

The sensor contains a set of glass ceramic substrates having different compositions. The sensor is positioned adjacent to the component of interest, and because the sensor is exposed to essentially the same thermal stressors as the component, the sensor can reveal important information about the thermal history of the component itself.

By exposing the sensor to a thermal stressor, each substrate—having a unique composition—responds with a different rate of nucleation and crystal growth. This nucleation and crystal growth increases the opacity of the glass ceramic substrates. The glass ceramic substrates in the sensor are initially clear, having no nucleation or crystallinity. Once the sensor is exposed to a sufficiently high thermal stressor, the percentage of opacity will change in at least one glass ceramic substrate. A reflective surface may be positioned under the glass ceramic substrates to allow light, directed through the substrates, to be reflected back through the same substrates in order to detect the amount of opacity. A hand held device, such as those similar to standard bar code readers, may be used to simultaneously obtain the opacity measurement for each of the glass ceramic substrates.

A refractory material, such as sapphire, for example, may be used between the reflective surface and the component as a supporting substrate or cover for the sensor. A clear refractory material is typically used in situations where it covers the sensor. The sensor may be attached, where desired, by any temperature resistant means, such as screws, rivets, bolts, welding, etc. In some cases, the reflective surface is applied as a coating to the refractory material.

An improved thermal history sensor having multiple glass ceramic substrates with unique compositions is disclosed. By positioning the sensor adjacent to a component subject to thermal stressors, each glass ceramic substrate reacts with a unique change in opacity. By comparing the values representing the opacity for each glass ceramic substrate, or thermal history fingerprint, to baseline data—which includes a series of thermal history fingerprints and corresponding data regarding the structural integrity of the component (typically stored in a database), valuable information about the expected remaining useful lifetime of the component may be obtained.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming that which is regarded as the present invention, the features, objects, and advantages of the present invention can be more readily ascertained with reference to the following description, in conjunction with the accompanying drawings, in which:

DETAILED DESCRIPTION

Figure 1:
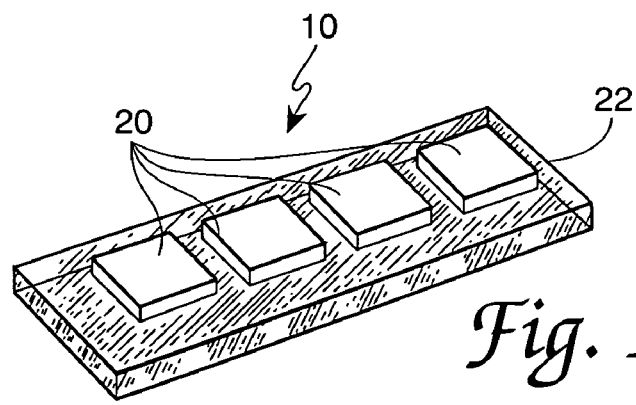
FIG. 1 is a perspective view of one embodiment of the thermal history sensor.
Figure 2:
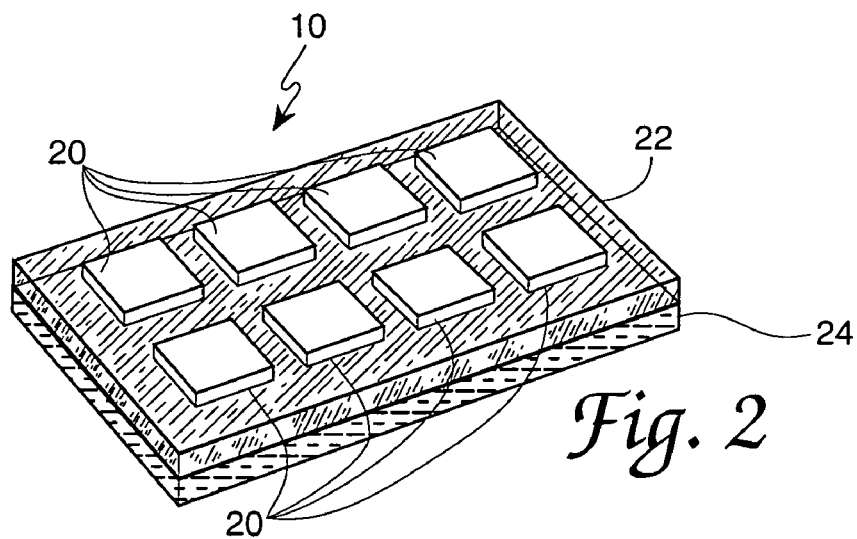
FIG. 2 is a perspective view of an alternative embodiment of the thermal history sensor.

Referring to the drawings, FIG. 1 depicts one embodiment of the sensor 10 having four different glass ceramic substrates 20 secured to a reflective surface 22. In this particular embodiment, glass ceramic substrates 20 are equally sized and spaced and are positioned linearly (single row array) within the same plane. An alternative embodiment of sensor 10, in which glass ceramic substrates 20 are arranged in a two-dimensional array, is illustrated in FIG. 2. In one embodiment, all glass ceramic substrates 20 have the same dimensions—as well as the same average height and width (i.e., substantially square), though this is not essential. In one embodiment, glass ceramic substrates 20 measure approximately 1 cm square. In other embodiments, glass ceramic substrates 20 are considerably smaller.

The sensor 10 includes at least two glass ceramic substrates 20 having different compositions. In one embodiment, no two glass ceramic substrates 20 of sensor 10 have the same material composition. Accordingly, each glass ceramic substrate 20 responds with different nucleation and crystal growth effects, after exposure to a specific temperature for a specific time, and therefore possesses a unique opacity. Glass ceramic substrates 20 may initially (prior to first use) be clear—that is, they have not yet been exposed to a sufficiently high temperature to cause significant nucleation or crystal growth. Glass ceramic substrates 20 may be formed from any of a wide variety of different compositions, such as Canacite, Eucryptite, or Cordierite, for example.

Figure 3:
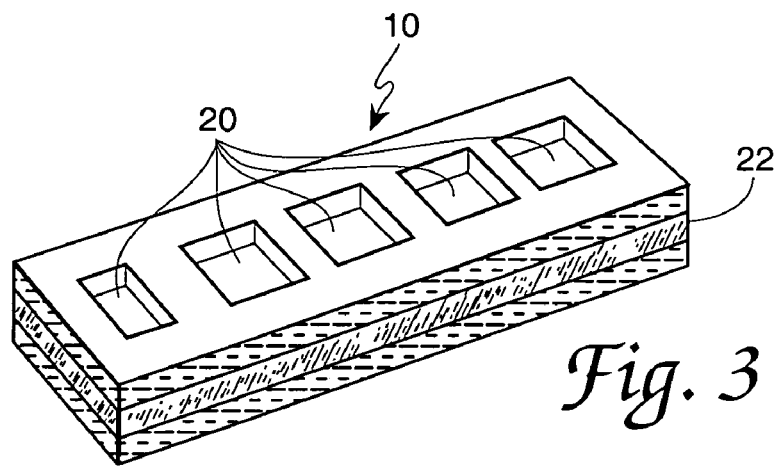
FIG. 3 is a perspective view of another alternative embodiment of the thermal history sensor.

Referring to FIG. 2, one embodiment is shown having a suitable refractory material 24, such as sapphire, for example, attached to reflective surface 22. Refractory material 24 may also be used, in alternative embodiments, to cover sensor 10, to support glass ceramic substrates 20, or to secure sensor 10 to the adjacent material. In one embodiment, as shown in FIG. 3, glass ceramic substrates 20 are inset into refractory material 24.

Figure 4:
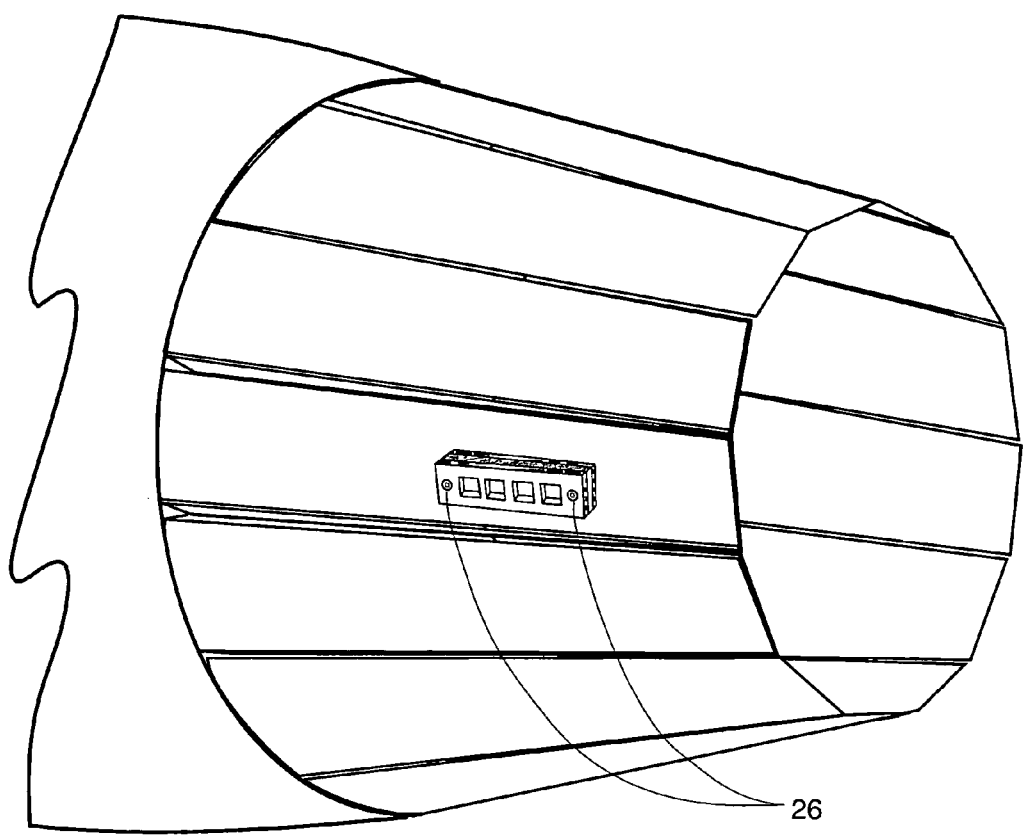
FIG. 4 illustrates another alternative embodiment of the thermal history sensor attached to a component.

Any desired number of sensors 10 may be positioned adjacent to components (not shown) for which the thermal history is desired. The term "adjacent" includes any positioning of sensor 10 within sufficient proximity to the component of interest such that both are exposed to the same or substantially similar thermal stressors, including situations where sensor 10 is physically attached or secured to the component. In one embodiment, sensor 10 is secured to a component with rivets, as shown in FIG. 4. Two rivets, passing through apertures 26, are used to secure sensor 10 to an aircraft component. Other attachment means, such as screws, bolts, welding, or any other method capable of withstanding the expected temperature stressors may be used as appropriate. To obtain more accurate data about the expected remaining useful lifetime of a component, multiple sensors may be attached to the same material. For example, sensors 10 may be attached to both the "hot side" and "cold side" surfaces of a jet engine thrust flap. In one embodiment, a component is outfitted with several different sensors 10 so that the thermal history fingerprint of each individual sensor 10 is combined to form a larger thermal history fingerprint for the component.

Once sensor 10 is exposed to a sufficiently high temperature to change the opacity of a single glass ceramic substrate 20, defined as $T_{MIN}$, and not yet exposed to a temperature so high as to solutionize all glass ceramic substrates 20 such that all of them become essentially clear again, defined as $T_{MAX}$, sensor 10 will provide the thermal history of the component positioned adjacent to it. That is, sensor 10 will provide valuable thermal history data for the component to which it is attached once it has been exposed at least once to a temperature greater than $T_{MIN}$, as long as it has never subsequently been exposed to a temperature greater than $T_{MAX}$. Because both $T_{MIN}$ is sufficiently low and $T_{MAX}$ is extremely high, relative to temperatures typically encountered in the operating environments of jet aircraft, sensor 10 is ideally suited to obtaining the thermal history of components of jet aircraft. Sensor 10 is also well suited for use on a wide variety of other surfaces, such as those in other engines and blast furnaces, for example.

Reflective surface 22 is formed from a heat resistant material having reflective characteristics, such as platinum, for example, or alternatively, may be a coating, having suitable reflective properties, applied to refractory material 24. The reflective surface 22 may be positioned under each glass ceramic substrate 20 so that light directed through each glass ceramic substrate 20 at a specific angle may be reflected back though the same glass ceramic substrate 20 in order to measure the opacity of the glass ceramic substrate 20. In preferred embodiments, the reflective surface or surfaces 22 and glass ceramic substrates 20 are positioned such that light may be directed at the same angle or angles through each of the glass ceramic substrates 20 in order to obtain an opacity reading for each glass ceramic substrate 20. This allows a bar code type reader (not shown), for example, to simultaneously direct light through each glass ceramic substrate 20, thereby obtaining the opacity measurements for each of the glass ceramic substrates 20 at one time.

The more glass ceramic substrates 20 used in sensor 10, the more information will be revealed about the thermal history of the adjacent component. This increased information comes at a cost of added complexity, however. The ideal number of glass ceramic substrates 20, which depends on the choice of compositions, will provide the minimum amount of thermal history necessary for a given component. Typically, sensor 10 includes between about four and about 36 glass ceramic substrates 20.

The opacity measurement for each glass ceramic substrate 20, which bears a strong correlation to the fraction of crystallization or solutionization, is typically classified into one of several ranges, from zero opacity (clear) to ten (opaque), for example. In other embodiments, a single value is used instead of a range of values. The ideal number of opacity ranges will again be the minimum number necessary to yield sufficient thermal history for a given component. In computer models, we've used ten equal opacity ranges between clear and opaque. Consistent with this design, each glass ceramic substrate 20 of one embodiment therefore provides ten possible values upon each measurement of sensor 10.

By way of example, sensor 10 of FIG. 1 initially reads "0-0-0-0." That is, all four glass ceramic substrates 20 are clear. After exposing sensor 10 to a temperature greater than $T_{MIN}$, the reading will be some non-zero value, such as "3-8-0-2," for example. In this specific example, the reading corresponds to a transmittance or opacity measurement in which the fraction of crystallization of the first glass ceramic substrate 20 is between 20–30 percent, the second glass ceramic substrate 20 is between 70–80 percent, et cetera. This reading, for any given number of glass ceramic substrates 20 and desired number of opacity ranges, provides a thermal history fingerprint. This fingerprint therefore consists simply of a series of values, typically numbers (one number for each glass ceramic substrate 20), where each value corresponds to the percentage of opacity of that particular glass ceramic substrate 20.

The sensor 10 and the component of interest, or sample thereof, may be subjected simultaneously to a variety of thermal stressors. The corresponding fingerprints may then be recorded, along with useful information about the resulting degradation, such as the expected remaining lifetime of the component, for example, using procedures known by those skilled in the art. This data can be generated by subjecting the component to thermal stressors in a controlled environment, such as a laboratory, as well as from actual testing or operational use. The resulting baseline data, which may readily be stored in a database, for example, can then be used as a benchmark for comparing future thermal history fingerprints.

Once the baseline data is sufficiently complete, the measurement (or thermal history fingerprint) from sensor 10, positioned adjacent to a component, can then be compared to the baseline data to yield the thermal history of the actual component of interest. The comparison is typically made using any of a variety of known computational techniques.

Figure 5A:
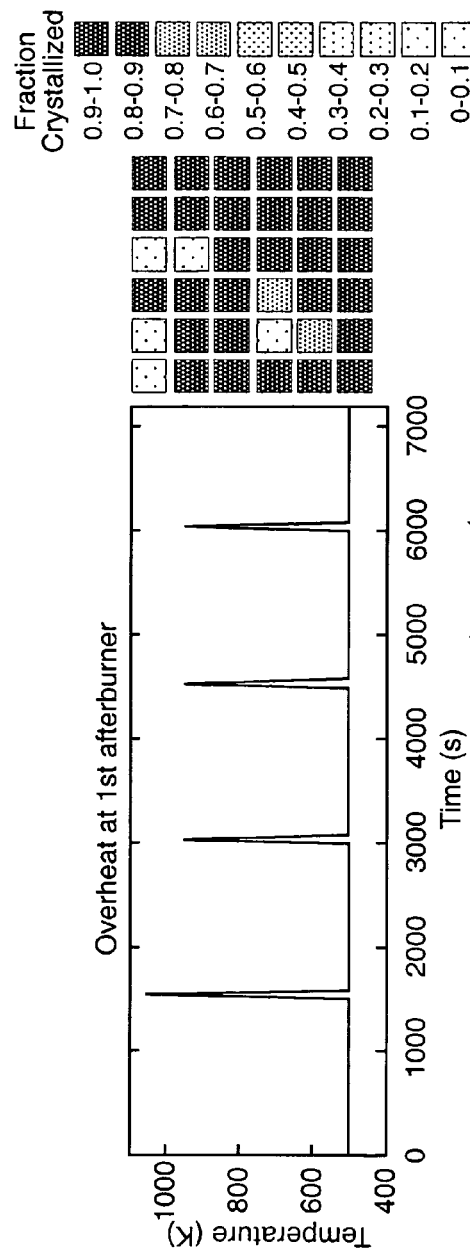
FIGS. 5a and 5b illustrate that different sequences of the same thermal stressors produce different thermal history fingerprints in another alternative embodiment of the thermal history sensor.
Figure 5B:
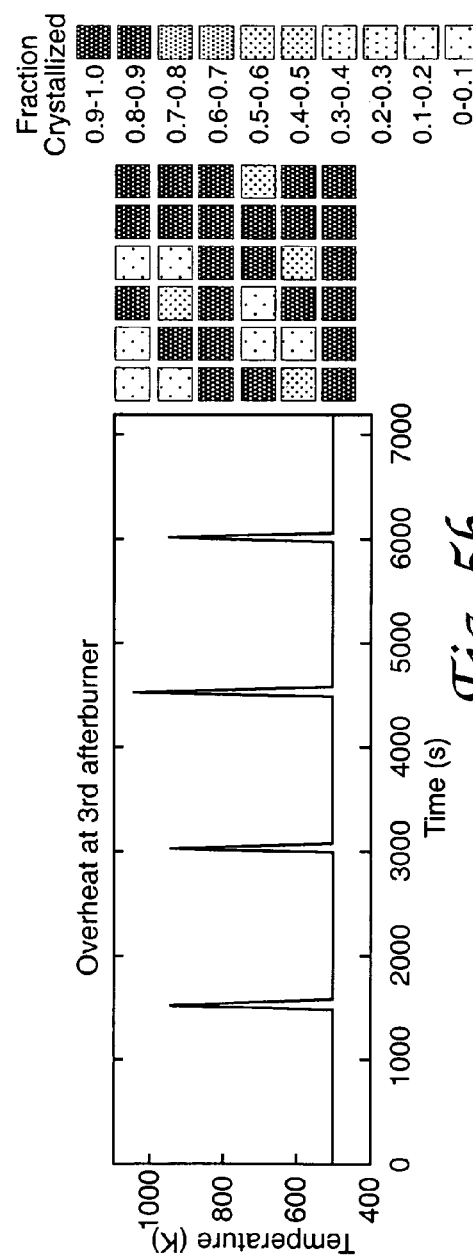

Through computer modeling, we've discovered that even slight changes in the thermal stressors result in different fingerprints. Indeed, as shown in FIGS. 5a and 5b, even the exact same thermal stressors applied in a different sequence have resulted in different thermal history fingerprints.

According to one embodiment, after an aircraft flight or during maintenance, sensors 10 are read by, for example, an optical device similar to a hand-held bar code type reader (not shown). This optical device simultaneously directs light from a wide laser beam through all glass ceramic substrates 20. The beam of light then reflects off reflective surface or surfaces 22 and is directed back to a detector (typically part of the optical device). The corresponding reading then provides the thermal history fingerprint, consisting of values representing the opacity range of each glass ceramic substrate 20, which is then compared to the baseline data. Upon comparing the measured fingerprint to this baseline data, which contains information as to the expected remaining useful lifetime of the component—based on the response to the known thermal stressors, an output is provided.

In one embodiment, the output consists of the expected remaining useful lifetime, in hours, of the component. In another embodiment, a simpler output is produced consisting of a "red," "yellow," or "green" light—indicating that the component "needs to be replaced immediately," "may need replacing soon," or "does not yet need replacing," respectively.

In one embodiment, other data is combined with the thermal history fingerprint, such as the number of hours a component has been in operational use, for example, to obtain increasingly accurate estimates of the expected remaining useful lifetime of the component.

A variety of alternative embodiments may be constructed to achieve the objects of the invention. For example, sensor 10 may be removed from its environment adjacent to a component where a device is used to measure the opacity of each glass ceramic substrate 20 without the need for a reflective surface 22. In another example, a light source (not shown) is positioned near the sensor 10 so as to allow in situ measurements of the opacity, which can then be transmitted to a remote receiver. This could allow, for example, a pilot to be alerted during flight of an imminent or failed component.

Characteristics of the described and illustrated embodiments are intended for illustrative purposes and are not to be considered limiting or restrictive. It is to be understood that various adaptations and modifications may be made to the embodiments presented herein by those skilled in the art without departing from the spirit and scope of the invention, as defined by the following claims and equivalents thereof.

We claim:

1. A thermal history sensor for estimating the remaining useful lifetime of a component exposed to temperature above 400 kelvin, comprising a plurality of glass ceramic substrates positioned adjacent to the component, wherein said glass ceramic substrates have different compositions whereby said glass ceramic substrates respond to a set of thermal stressors with different changes in opacity.

2. The thermal history sensor of claim 1, further comprising an attachment means for securing said thermal history sensor to the component.

3. The thermal history sensor of claim 1, further comprising a reflective surface, positioned under said glass ceramic substrates, for reflecting a beam of light transmitted through said glass ceramic substrates back through same said glass ceramic substrates.

4. The thermal history sensor of claim 3, further comprising a refractory material adjacent to said reflective surface.

5. The thermal history sensor of claim 4, wherein said refractory material comprises sapphire.

6. The thermal history sensor of claim 4, wherein said reflective surface is a coating applied to said refractory material.

7. The thermal history sensor of claim 1, wherein said glass ceramic substrates are aligned in a predetermined array within the same plane.

8. The thermal history sensor of claim 1, wherein said thermal history sensor comprises at least 4 and no more than 36 of said glass ceramic substrates.

9. A thermal history sensor for estimating the remaining useful lifetime of a component, comprising:
    a plurality of glass ceramic substrates positioned adjacent to the component, wherein each said glass ceramic substrate has a composition different from every other said glass ceramic substrate;
    a reflective surface positioned under said glass ceramic substrates for reflecting a beam of light transmitted through said glass ceramic substrates back through same said glass ceramic substrates; and
    a refractory material positioned adjacent to said reflective surface.

10. The thermal history sensor of claim 9, wherein said reflective surface comprises platinum.

11. The thermal history sensor of claim 9, wherein said thermal history sensor comprises at least 3 and not more than 36 said glass ceramic substrates aligned in a predetermined array within the same plane.

12. The thermal history sensor of claim 9, wherein said refractory material comprises an attachment means for securing said thermal history sensor to the component.

13. A method for obtaining the thermal history of a component, comprising:
    positioning at least one thermal history sensor adjacent to the component, wherein said thermal history sensor comprises a plurality of glass ceramic substrates having different compositions;
    exposing the component and said thermal history sensor to a set of thermal stressors; and
    measuring the percentages of opacity of said glass ceramic substrates.

14. The method for obtaining the thermal history of a component according to claim 13, further comprising the step of positioning a reflective surface adjacent to said glass ceramic substrates wherein a beam of light transmitted at specific angles through said glass ceramic substrates is reflected back through said same glass ceramic substrates.

15. The method for obtaining the thermal history of a component according to claim 13, further comprising the step of positioning a refractory material adjacent to said reflective surface.

16. The method for obtaining the thermal history of a component according to claim 13, further comprising the step of comparing the percentages of opacity of said glass ceramic substrates to baseline data whereby information about the expected remaining useful lifetime of the component is obtained.

17. The method for obtaining the thermal history of a component according to claim 13, wherein the step of positioning said thermal history sensor adjacent to the component comprises the step of attaching said thermal history sensor to the component.

18. The method for obtaining the thermal history of a component according to claim 13, wherein the step of positioning said thermal history sensor adjacent to the component comprises the step of aligning said plurality of glass ceramic substrates into a predetermined array within the same plane.

19. The method for obtaining the thermal history of a component according to claim 13, further comprising the step of obtaining a thermal history fingerprint from said percentages of opacity of said glass ceramic substrates.

* * * * *